US006095916A

United States Patent [19]

Tamaki

[11] Patent Number: 6,095,916

[45] Date of Patent: Aug. 1, 2000

[54] COIN LIFTING MECHANISM

[75] Inventor: Masami Tamaki, Tokyo, Japan

[73] Assignee: Universal Sales Co., Ltd., Tokyo, Japan

[21] Appl. No.: 09/118,476

[22] Filed: Jul. 17, 1998

[30] Foreign Application Priority Data

Aug. 6, 1997 [JP] Japan .................................... 9-211813

[51] Int. Cl.[7] .............................. G07D 1/00; B65G 29/02

[52] U.S. Cl. ............................................... 453/57; 198/624

[58] Field of Search .................................. 453/30, 32–35, 453/50, 49, 57; 221/267; 198/624

[56] References Cited

U.S. PATENT DOCUMENTS 719,459 2/1903 Goetze et al. ............................ 453/35

1,808,270 6/1931 Vogt .......................................... 453/35

5,232,398 8/1993 Maki .......................................... 453/57

FOREIGN PATENT DOCUMENTS

0295862A2 12/1988 European Pat. Off. .

0311320A2 4/1989 European Pat. Off. .

0526049A2 2/1993 European Pat. Off. .

*Primary Examiner*—F. J. Bartuska

*Attorney, Agent, or Firm*—Townsend and Townsend and Crew, LLP

[57] ABSTRACT

A coin lifting mechanism employs a pair of rollers to lift coins reliably to an elevated position. The pair of rollers have spaced rotating surfaces that are resiliently urged toward one another and against opposing faces of the coin to hold the coin therebetween. The rotating surfaces rotate in opposite directions to produce a driving force in a direction to drive the coins one-by-one past the rollers. A coin lifting rail extends from a coin receiving end disposed adjacent the pair of rollers upward to a coin discharging end. The coin lifting rail has a coin passage which receives the coins from the rollers and guides the movement of the coins. The coins in the coin passage are stacked edge-to-edge and slidably move along the passage under the driving force generated by the rollers toward the coin discharging end.

25 Claims, 4 Drawing Sheets

COIN LIFTING MECHANISM

BACKGROUND OF THE INVENTION

The present invention relates to a coin lifting mechanism for transferring coins or tokens (hereinafter referred to as "coins") used in automatic vendor, automatic cash dispensers, automatic money changing machines, game machines and the like, from a low position to an elevated position in the machine.

A typical example of a game machine which uses coins is a slot machine. To play a conventional slot machine, a player takes coins in a coin tray provided at the bottom front portion of the game machine and inserts the coins one-by-one into a coin charging slot also provided at the front of the machine. The player then selects a playing mode and pulls a start lever to start the game. An improved type of slot machine automatically transfers coins into the machine without requiring them to be fed one-by-one into the coin charging slot. A slot machine of the automatic coin charging type has a main hopper similar to that used in conventional machines for accommodating and dispensing coins. In addition, a smaller hopper referred to as a sub-hopper is provided for temporarily storing coins charged automatically from outside the machine and feeds out the coins. Because the coin tray which receives the coins that are dispensed is located in a lower portion of the machine, a charging slot for automatic charging of the coins from the coin tray is also located at a lower portion of the machine. The main hopper is disposed at an elevated position for dispensing the coins. Consequently, the coins must be transferred upward from the sub-hopper to the main hopper.

When a coin feed-out mechanism employs a rotary disk of the same type as that of the dispensing mechanism used in the main hopper for feeding coins out of the sub-hopper, the presence of improper coins can give rise to a problem. The rotary disk mechanism feeds out coins in serial contact so that the driving force can be transferred to the coins successively to push the coins upward and forward. Lifting the coins requires a relatively large amount of driving force. To screen out improper coins, however, a coin selector must be installed downstream of the sub-hopper. At the same time, the coins must be transferred upward from the sub-hopper to the main hopper because of their relative positions. Because of the presence of the coin selector, the force exerted on the coins by the sub-hopper cannot be used as the driving force for transferring the coins.

In addition, the difficulty of lifting the coins can be caused by factors other than the presence of a coin selector. The problem can be found in automatic vendors, automatic cash dispensers, automatic money changing machines and the like, and is present when the force of feeding out the coins cannot be utilized to lift the coins.

Furthermore, coin transfer speed in the slot machine is preferably equal to or slightly faster than the speed that a player would manually charge the coins successively into the charging slot of a conventional machine. It is desirable to achieve such coin transfer speed.

SUMMARY OF THE INVENTION

The present invention is directed to a coin lifting mechanism which avoids the problems and disadvantages of the prior art. This goal is accomplished by providing a pair of rotating bodies that contact and impart a driving force on each coin to drive the coins in successive contact up a coin lifting rail to an elevated position. In this way, the coins are reliably lifted where the force of feeding out the coins cannot be utilized to lift the coins when, for instance, a coin selector is used to screen out improper coins in a slot machine. The coin lifting mechanism ensures automatic coin charging operation of the slot machine while accommodating the coin screening operation by the coin selector.

According to the invention, the pair of rotating bodies such as rollers have spaced rotating surfaces that are resiliently urged toward one another to hold a coin therebetween. Springs are used to resiliently urge the rotating surfaces and a stopper spaces the rotating surfaces by a minimum gap. The minimum gap is desirably slightly smaller than the thickness of the coins, and can be adjusted to accommodate differently sized coins as desired. The rotating bodies are rotated in opposite directions to produce a driving force in a direction substantially tangent to the rotating surfaces to drive the coins therethrough one-by-one. The rollers are rotated by a motor. A gear system is desirably used to synchronize the rotation of the rollers.

A coin lifting rail extends from a coin receiving end disposed adjacent the pair of rollers upward to a coin discharging end. The coin lifting rail has a pair of sheets spaced by a spacer to define a coin passage which guides the movement of the coins driven by the rollers. The coin passage is sized to receive the coins edge-to-edge in series. In a preferred embodiment, the coin passage has a width slightly larger than the diameter of the coins and a depth slightly larger than the thickness of the coins. The coin passage may be linear or nonlinear as dictated by the location of the coin receiving end and coin discharging end.

In a preferred embodiment, the coil transporting rollers extend through appropriate openings in the coin lifting rail into the coin passage thereof where the rollers engage the faces of each coin and drive the coin along the coin passage. By engaging the faces of the coin while it is in the coin passage, it is possible to apply larger coin moving forces and increase the speed with which the coins are advanced through the coin passage of the rail.

The coins slide through the coin passage under the driving force one-by-one toward the coin discharging end. The driving force of each coin that leaves the rollers pushes it and preceding coins forward along the coin passage. The coins move in series and in successive contact up the coin lifting rail. By contacting and releasing the coins one-by-one, the rollers advance the coins in sliding motion through the coin passage by incremental displacements each being substantially equal to the size of the coins.

DESCRIPTION OF THE PREFERRED EMBODIMENTS

Figure 1:
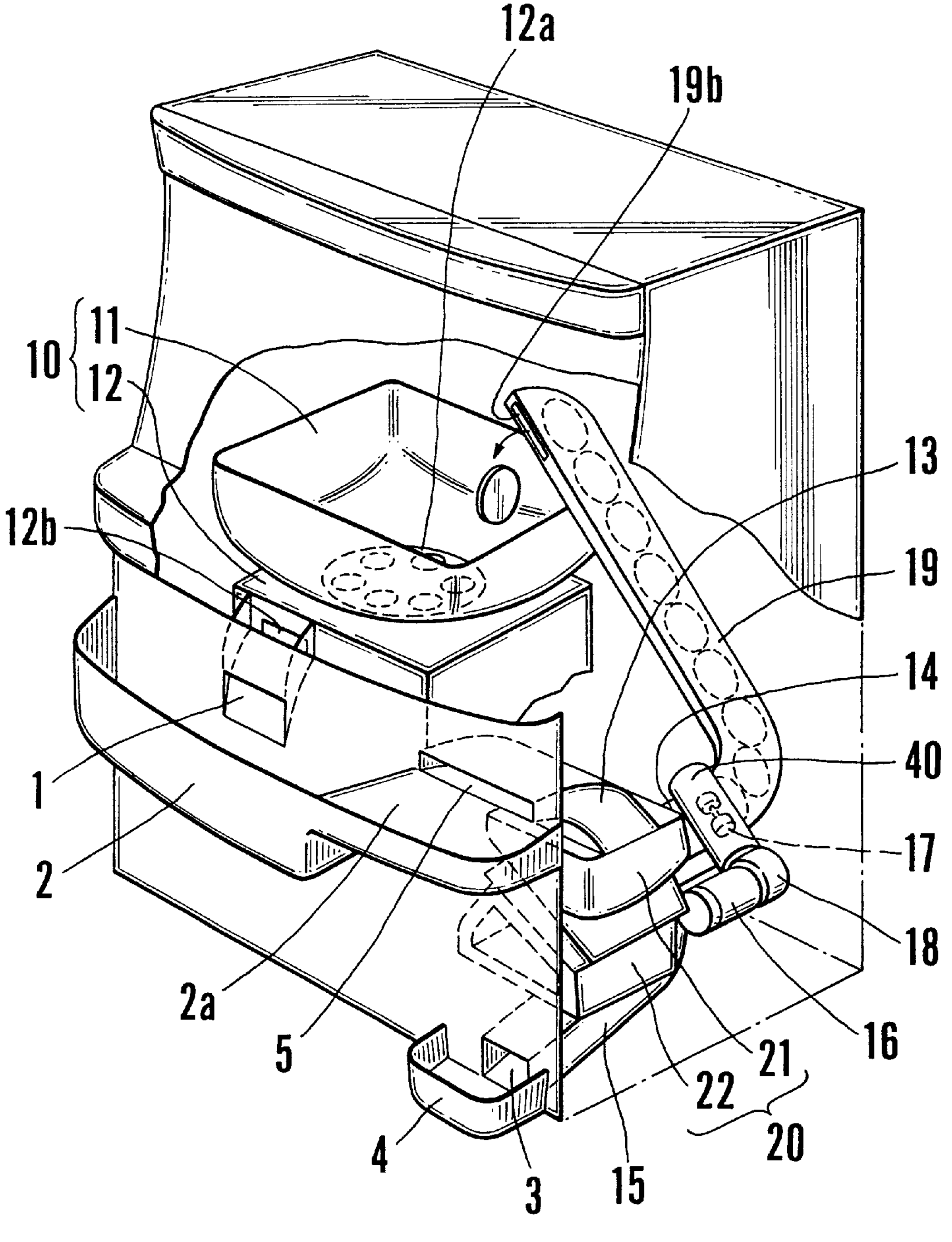
FIG. 1 is a perspective view schematically illustrating a slot machine of the automatic coin charging type employing a coin lifting mechanism of the present invention.

FIG. 1 illustrates a slot machine of the automatic coin charging type with a partially cut-away view. The slot machine employs a coin lifting mechanism according to the present invention. For simplicity, a number of features are omitted from the drawing, such as a start button, a stop button, rotary reel windows, lamps, and indicators.

The slot machine has a coin dispensing outlet 1 and a coin tray 2 for receiving the coins dispensed from the outlet 1. The dispensing outlet 1 and coin tray 2 are disposed at the lower front portion of the machine. A step 2*a* is formed next to the coin tray 2. A horizontal coin charging slot 5 is provided adjacent the step 2*a* for feeding coins in the automatic coin charging operation.

A hopper container 11 is disposed above the coin dispensing outlet 1 for accommodating the coins to be dispensed. A hopper body 12 just below the hopper container 11 feeds out the coins supplied from the hopper container 11 discretely in a specified direction by means of the rotation of a rotary disk 12*a* which is arranged in an inclined position. The hopper container 11 and hopper body 12 constitute the main hopper 10. The coins are dispensed in the direction tangent to the rotary disk 12*a* through an aperture 12*b* formed at a side to the coin dispensing outlet 1. The operation of the main hopper 10 is known in the art, and a description can be found, for example, in Japanese Laid-open Patent Publication No. Hei-7-114658.

A sub-hopper 20 is disposed at the lower right portion of the machine near the coin charging slot 5. The sub-hopper 20 is smaller in size than the main hopper 10, but is similar in construction and operation. The sub-hopper 20 includes a hopper container 21 and a hopper body 22, and employs the rotation of an inclined rotary disk to dispense coins discretely in a tangential direction. A chute 13 extends from the coin charging slot 5 to the hopper container 21 to guide coins inserted into the coin charging slot 5 to the hopper container 21. A coin selector 14 is installed downstream of the sub-hopper 20 for screening out improper coins. A discharge outlet 3 and a return tray 4 are disposed near the coin selector 14 at the lower right corner of the machine. The discharge outlet 3 is provided for discharging improper coins into the return tray 4. Details of the sub-hopper 20 are shown in FIGS. 2 and 3.

Figure 2:
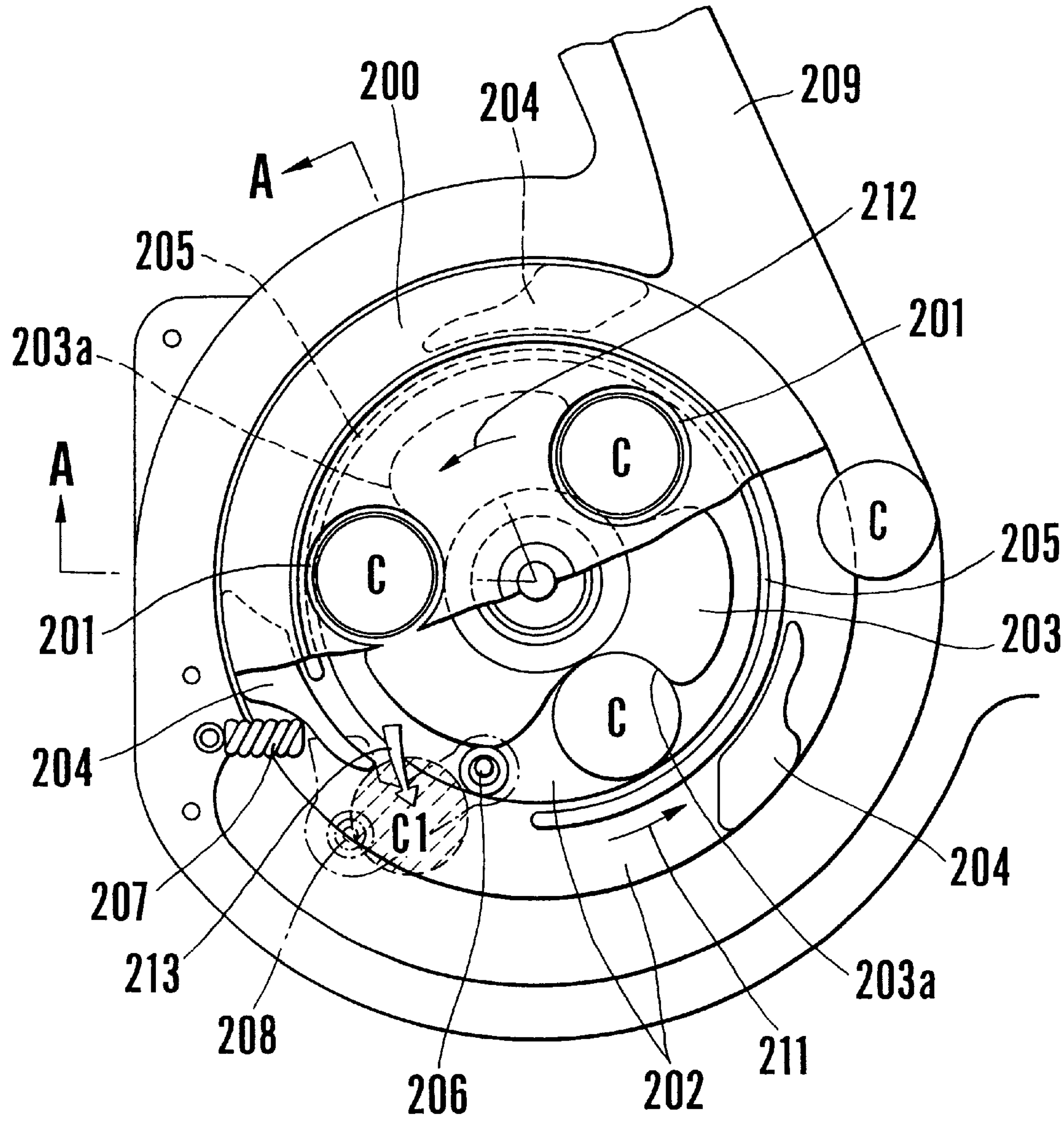
FIG. 2 is a partially cut-away plan view of a sub-hopper used in the slot machine of FIG. 1.
Figure 3:
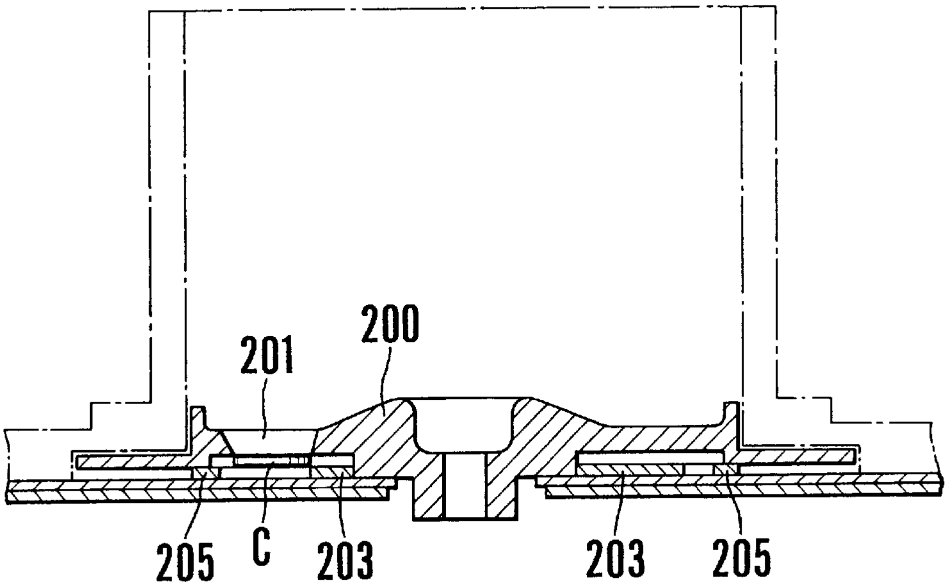
FIG. 3 is a cross-sectional view along line A—A of the sub-hopper of FIG. 2.

Referring to FIGS. 2 and 3, a rotary disk 200 of the sub-hopper 20 includes a plurality of circular apertures 201 of a diameter slightly larger than the coin diameter. The partial cut-away view of FIG. 2 shows two of the three apertures 201 in the rotary disk 200. The rotary disk 200 is typically formed in an integral body of a resin. A coin receiving plate 202 is disposed below the rotary disk and can rotate with the rotary disk 200. The coin receiving plate 202 has a coin guide claw 203 which has coin accommodating notched recesses 203*a* and coin feed-out pieces 204 located near the periphery surrounding the notched recesses 203*a*. The notched recesses 203*a* match the circular apertures 201 in number. The coin feed-out pieces 204 in turn match the notched recesses 203*a* in number, and are disposed in a particular spatial relationship with the notched recesses 203*a*.

An arc-shaped coin guide rail 205 having a substantially circular shape is fixed between the coin guide claw 203 and the coin feed-out pieces 204. A coin separating roller 206 is provided near one end of the coin guide rail 205, and is urged in a counterclockwise direction by a spring 207 with a pin 208 serving as a fulcrum. Reference numeral 209 denotes a coin feed path leading to the coin selector 14.

When the rotary disk 200 and the coin receiving plate 202 are rotated together in a counterclockwise direction as indicated by the arrow 211, the coins stored in the hopper container 21 of the sub-hopper 20 fall through the circular apertures 201 onto the coin receiving plate 202. These coins as denoted by reference character C are accommodated in the notched recesses 203*a* of the coin guide claw 203. The rotation of the coin guide claw 203 in the counterclockwise direction as denoted by the arrow 212 moves the coins C and the coin guide rail 205 guides the coins C one-by-one toward the coin separating roller 206. When a coin C comes in contact with the roller 206, the roller 206 guides the movement of the coin C as it is pushed by a curved portion of the notched recess 203*a*. The coin C moves away from the notched recess 203*a* as indicated by the arrow 213, and enters a path located near the periphery as coin C1 shown in dashed shading. At this time, a coin feed-out piece 204 which rotates in synchronization with the coin guide claw 203 reaches the position of the coin C1. The tip of the coin feed-out piece 204 hits the periphery of the coin C1 and flips the coin C1. As a result, the coin is fed along the direction of the coin feeding path 209 out of the sub-hopper 20 onto the coin selector 14.

Referring to FIG. 1, the coin selector 14 downstream of the sub-hopper 20 screens out improper coins which may be included in the coins inserted through the coin charging slot 5. This function is important in the machines of the automatic coin charging type. In this embodiment, the coin selector 14 screens coins based on coin diameter. The coin selector 14 employs an aperture slightly smaller in diameter than authentic coins so that an improper coin having a smaller diameter will fall through the aperture while passing through the coin selector 14. The rejected coin is discharged through a chute 15 and discharge port 3 onto the return tray 4. Coin selectors of this type are known and will not be described in detail.

The coin lifting mechanism is installed downstream of the coin selector 14 for imparting coin driving force to lift the coins to the main hopper 10. The coin lifting mechanism comprises a pair of rollers 17 which are driven in rotation by a motor 16. A gear box 18 is provided for changing the speed and direction of rotation of the rotary shaft of the motor 16.

Figure 4:
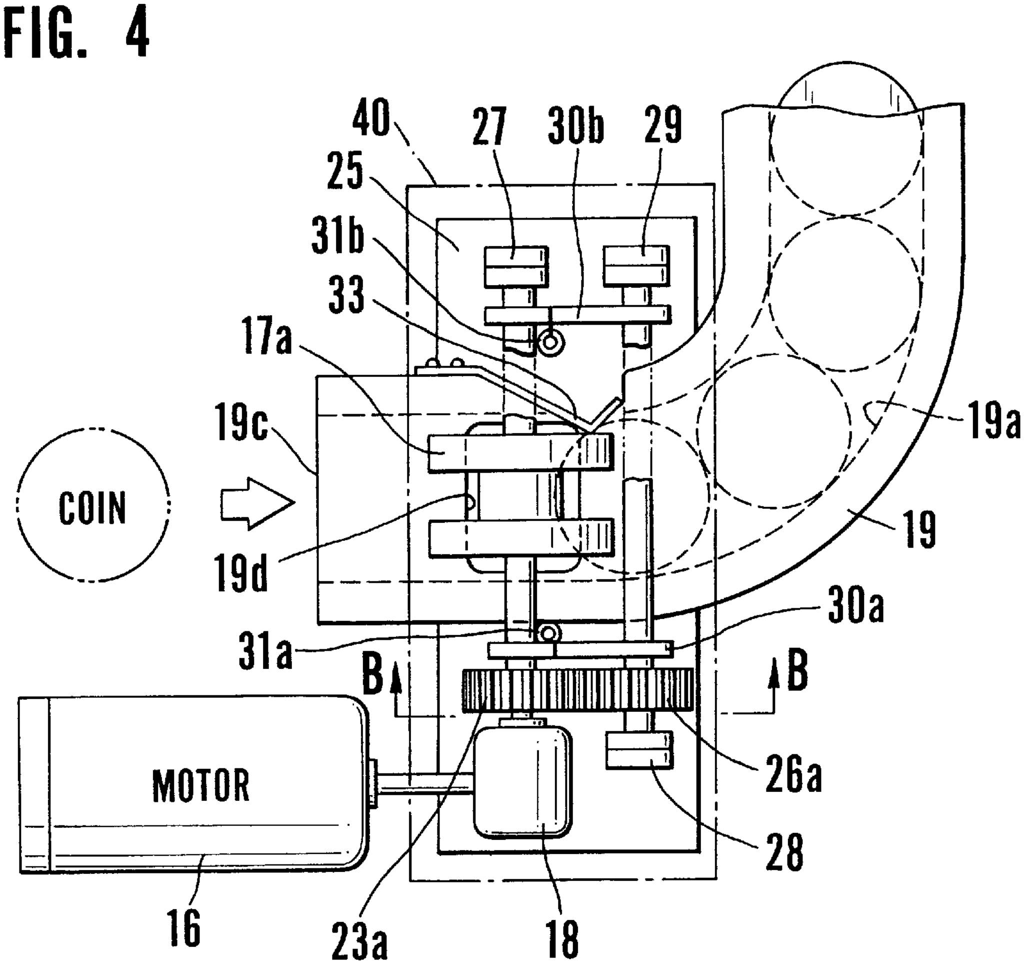
FIG. 4 is a plan view illustrating the coin lifting mechanism of FIG. 1.

As shown in FIGS. 1 and 4–5B, a coin lifting rail 19 extends from the rollers 17 up toward the main hopper 10 for lifting the coins to the hopper container 11 of the main hopper 10. The rollers 17 include an upper roller 17*a* and a lower roller 17*b*. The coin lifting rail 19 is formed by, for example, installing two thin metal sheets with a spacer interposed therebetween along both edges to form a passage 19*a*. The spacer is typically made of a resin. As best seen in FIG. 5A, the passage 19*a* has a flat cross section and a size through which a coin can pass. For instance, the width of the passage 19*a* is slightly larger than the diameter of the coins and the depth of the passage 19*a* is slightly larger than the thickness of the coins. The passage 19*a* is open at both ends with a coin discharging port 19*b* provided at the discharge end (FIG. 1) and an intake aperture 19*c* serving as a coin introducing port provided at the starting end (FIGS. 4 and 5A). The coin lifting rail 19 has apertures 19*d* formed in the sheet metal sides of rail 19 just upstream of intake aperture 19C. Apertures 19*d* are sized so that the peripheries of rollers 17*a*, 17*b* protrude through them into the coin passage 19*a*. As a result, the upper roller 17*a* and lower roller 17*b* can each contact the respective face of the coin passing through the passage 19*a*, as best seen in FIG. 5A. The coin lifting rail 19 of this embodiment has a bend of about 90° and is inclined upward with a mild gradient as dictated by the relative positions of the sub-hopper 20 and main hopper 10. The coin lift rail 19 may take on other configurations if the relative positions of the sub-hopper 20 and main hopper 10 are changed.

Figure 5A:
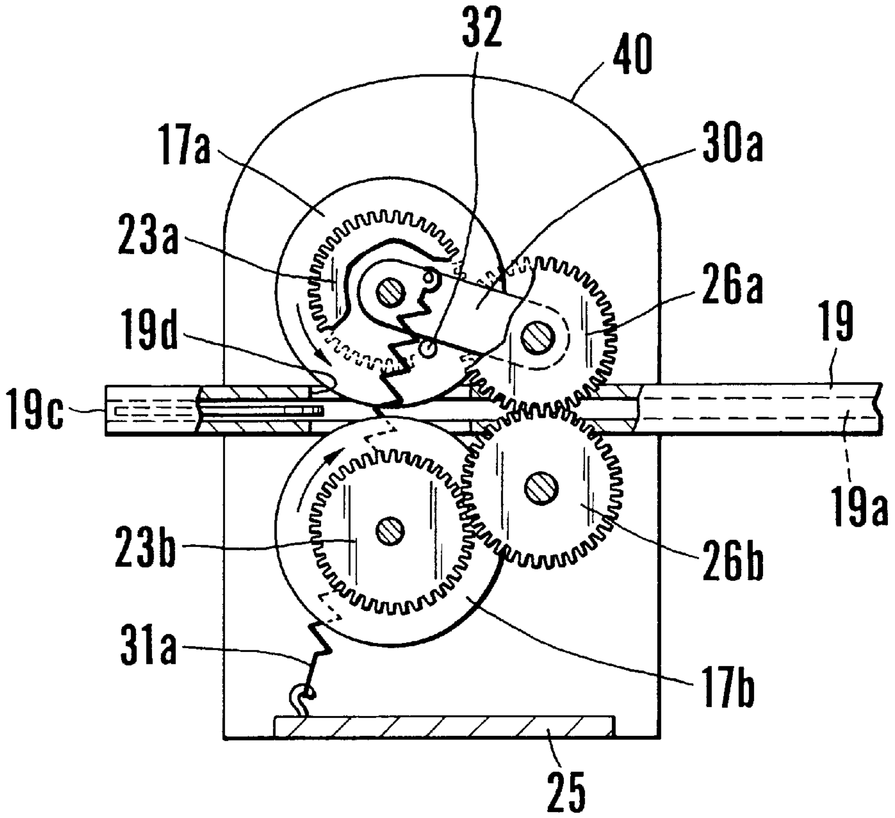
FIG. 5A is a side view along line B—B of the coin lifting mechanism of FIG. 4.

As shown in FIGS. 4 and 5A, the upper roller 17*a* and lower roller 17*b* are located respectively above and below the coin lifting passage 19*a*. The rollers are typically made of rubber. The upper roller 17*a* and lower roller 17*b* are arranged with a space or gap therebetween so that the rollers lightly touch the faces of the coin being lifted. On the front face side where the motor 16 is disposed, an upper roller gear 23*a* is fixed on the shaft of the upper roller 17*a*. A lower roller gear 23*b* is fixed on the shaft of the lower roller 17*b* on the other side. The upper roller gear 23*a* and lower roller gear 23*b* are typically made of a resin having high durability, such as POM (polyacetal). One end of the shaft of the lower roller 17*b* is linked via the gear box 18 with the rotary shaft of the motor 16, while the other end is supported by a support bearing 27 which is planted in a base 25. On the front face side of the roller mechanism are an upper idler gear 26*a* meshed with the upper roller gear 23*a* and a lower idler gear 26*b* meshed with the lower roller gear 23*b*. The two idler gears 26*a*, 26*b* are meshed with one another. Rotary shafts of the idler gears 26*a*, 26*b* extend across the coin transfer passage 19*a* in parallel with the rotary shafts of the upper and lower roller gears 23*a*, 23*b*. The idler gears 26*a*, 26*b* are supported by a support bearing 28 which is mounted on the base 25 on the front side and a support bearing 29 which is mounted on the base 25 on the other side.

Idling levers 30*a*, 30*b* are provided on both sides of the coin transfer passage 19*a*, and loosely link the rotary shaft of the upper idler gear 26*a* and the rotary shaft of the upper roller gear 23*a*. Springs 31*a*, 31*b* are fastened at one end to respectively urge idling levers 30*a*, 30*b* in a counterclockwise direction, with the rotary shaft of the upper idler gear 26*a* serving as the fulcrum. Movement of the springs 31*a*, 31*b* is restricted by a stopper 32. The stopper 32 extends from the inner wall of a roller case 40 which encloses the entire roller mechanism or from the base 25. The idling lever 30*a* serves the function of coordinating with the spring 31*a* to adjust the space between the upper and lower rollers 17*a*, 17*b*. The idling lever 30*b* and spring 31*b* serve a similar function.

The gap between the upper roller 17*a* and lower roller 17*b* is controlled to a size (e.g. 1 mm) that is slightly smaller than the thickness (e.g. 1.5 mm) of the coin by the biasing force of the springs 31*a*, 31*b* and the stopper 32. When the gap between the upper roller 17*a* and lower roller 17*b* is controlled properly, lifting of the coins from the selector 14 is performed smoothly as the coins are properly held between the rollers to receive a proper driving force.

The coin lifting rail 19 has a notch on one side edge at a position near the upper and lower rollers 17*a*, 17*b*. A leaf spring 33 is bent adjacent its tip for engaging the notch to prevent coins from moving backward, as best seen in FIG. 4. This is achieved by arranging the bent portion at the tip of the leaf spring 33 to enter slightly into the coin passage 19*a*. The tip of the leaf spring 33 prevents the coins which have been fed by the upper and lower rollers 17*a*, 17*b* from returning in the reverse direction by gravity.

Figure 5B:
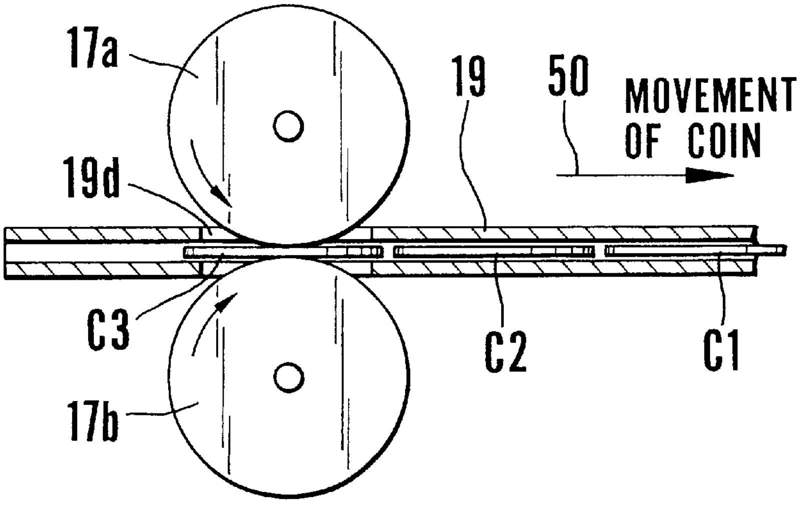
FIG. 5B is a schematic view of the coin lifting mechanism of FIG. 5A illustrating the movement of the coins.

The operation of the coin lifting mechanism in the slot machine of the automatic coin charging type shown in FIG. 1 is described as follows. In order to charge coins automatically, the player rakes the coins contained in the coin tray 2 with a hand up to the step 2*a* and lets the coins drop through the coin charging slot 5 into the machine. This is all that the player needs to do because the machine automatically charges the coins that are dropped through the slot 5. The coins are guided through the chute 13 into the hopper container 21 in which they are accumulated. The rotary disk 200 of the hopper body 22 rotates to feed the coins out discretely in the tangential direction. The coins fed out of the hopper body 22 are screened when they reach the coin selector 14, which rejects improper coins and discharges them through the chute 15 to the return tray 4. Proper coins pass through the coin selector 14 with an inertia or momentum which they have acquired from being moved by the rotary disk 200. The coins then enter a duct or coin passage 19*a* defined by the coin lifting rail 19 through the intake aperture 19*c* where they are engaged between the upper roller 17*a* and lower roller 17*b* which drive them in a forward direction through rail passage 19*a*. The motor 16 rotates the rotary shaft of the gear box 18 to directly drive the lower roller 17*b*. The upper roller 17*a* is driven in rotation by the lower roller gear 23*b* through the lower idler gear 26*b*, the upper idler gear 26*a*, and the upper roller gear 23*a*. As a result, the coin held between the upper and lower rollers 17*a*, 17*b* is driven by both rollers as shown in FIG. 5B in the direction of the arrow 50 against the pressure of the reverse movement preventing leaf spring 33. In this process, the driving force of the rollers is transmitted to the coin because it is held between the rollers 17*a*, 17*b* by the urging action of the springs 31*a*, 31*b* which act on the rollers via the idling levers 30*a*, 30*b*. Therefore, the coin is transferred reliably through the passage 19*a*. Because the driving force is lost when the coin leaves the upper and lower rollers 17*a*, 17*b*, the coin stops at that position.

The next coin fed out by the rotary disk 200 of the sub-hopper 20 is held between the upper and lower rollers 17*a*, 17*b* and transferred in a manner similar to that described for the first coin. When the second coin leaves the rollers 17*a*, 17*b*, it contacts the preceding coin and pushes it forward in a sliding motion along the passage 19*a*. Subsequent coins are similarly transferred to push the preceding coins forward, thereby forming a series of coins in the passage which are in edge-to-edge contact with each other. Thus, the coins stacked edge-to-edge in passage 19*a* are advanced in increments equal to the diameter of the coins.

FIG. 5B illustrates three coins C1, C2, C3 that are transferred successively from a low position to an elevated position. The coins are lined up in series and are in successive contact with preceding and/or subsequent coins. The driving force imparted onto the last coin by the upper and lower rollers 17*a*, 17*b* as it leaves the rollers pushes the preceding coins forward and upward. By contacting and releasing the coins one-by-one, the rollers 17*a*, 17*b* advance the coins in sliding motion through the coin passage 19*a* by incremental displacements each being substantially equal to the size of the coins. The coins reach the top and are discharged one-by-one from the coin discharge port 19*b* at the end of the coin lifting rail 19 and fall into the hopper container 11 of the main hopper 10. When the sub-hopper 20 runs out of coins and the last coin is pushed forward by the upper and lower rollers 17*a*, 17*b*, the motor 16 stops in a specified period of time. Except for those that remain lined up in the coin lifting rail 19, all the coins charged through the coin charging slot 5 are transferred through the rail 19 to the hopper container 11. Automatic charging of the coins is completed.

The coins that remain in the coin lifting rail 19 tend to move down the rail by their weight after the motor 16 stops. This reverse movement is prevented by the reverse movement preventing spring 33 so that the coins stay in position on the coin lifting rail 19.

The speed of lifting the coins by the coin lifting mechanism can be freely changed by adjusting the coin feeding speed, namely, the feeding speed of the rotary disk 200 of the sub-hopper 20, and the rotating speed of the upper and lower rollers 17*a*, 17*b*. It is easy to achieve a speed equal to or higher than the speed a player would manually charge coins with a conventional slot machine.

Although the intake end of the coin lifting rail 19 is disposed slightly upstream of the coin lifting mechanism in the presently preferred embodiment shown in FIGS. 4–5B, it may alternatively coincide with or be disposed just downstream of the coin lifting mechanism so that the coins are driven by the mechanism from the beginning of the coin lifting rail 19. Further, the configuration of the coin lifting rail is not restricted to that described in the embodiment. For instance, the central portion of the rail 19 on one side may be open along the longitudinal direction so that part of the coins being lifted can be seen from the outside.

The coin lifting mechanism of the invention can lift and transfer coins reliably from a low position to a high position, where the force of feeding out the coins cannot be utilized to lift the coins. When the coin lifting mechanism is used in a slot machine, for example, an automatic coin charging machine can be achieved as described above. The tedious operation of manually charging coins one-by-one in conventional slot machines can be eliminated. Because the coins are driven by roller peripheries that engage the faces of the coins, they are lifted reliably and the lifting speed is adjustable. Further, the coin lifting mechanism of the invention can be used in game machines that use coins, automatic vendors, automatic cash dispensers, automatic money changing machines, and the like.

What is claimed is:

1. A coin lifting mechanism for lifting coins, the coin lifting mechanism comprising:

a pair of rotating bodies having spaced rotating surfaces that are resiliently urged toward one another to hold coins therebetween, the bodies rotating in opposite directions to produce a driving force in a direction to drive the coins while the coins pass therebetween one-by-one past the bodies in edge-to-edge contact; and a coin lifting rail extending from a coin receiving end disposed adjacent the pair of rotating bodies upward to a coin discharging end, the coin lifting rail having a coin passage through which the coins driven past the rotating bodies slide in series in edge-to-edge contact between the coin receiving end and the coin discharging end under the driving force toward the coin discharging end.

2. The coin lifting mechanism of claim 1 wherein the pair of rotating bodies include a pair of rollers having substantially circular rotating surfaces.

3. The coin lifting mechanism of claim 1 wherein the direction of the driving force is substantially tangent to the rotating surfaces.

4. The coin lifting mechanism of claim 1 wherein the coin lifting rail extends from the coin receiving end substantially in the direction of the driving force.

5. The coin lifting mechanism of claim 1 wherein the coin lifting rail extends nonlinearly from the coin receiving end to the coin discharging end.

6. The coin lifting mechanism of claim 1 further comprising a stopper to space the pair of rotating surfaces by a minimum gap.

7. The coin lifting mechanism of claim 6 wherein the minimum gap is slightly smaller than a thickness of the coins.

8. The coin lifting mechanism of claim 6 wherein the stopper is adjustable to adjust the minimum gap.

9. The coin lifting mechanism of claim 1 further comprising a reverse movement preventing mechanism coupled to the coin lifting rail to prevent the coins disposed in the coin passage from sliding back toward the coin receiving end.

10. The coin lifting mechanism of claim 9 wherein the reverse movement preventing mechanism comprises a bent leaf spring engaging a slot of the coin passage at the coin receiving end.

11. The coin lifting mechanism of claim 1 wherein the coin passage includes a substantially uniform channel having a width slightly larger than a diameter of the coins and a depth slightly larger than a thickness of the coins.

12. The coin lifting mechanism of claim 1 wherein the coin lifting rail includes a pair of sheets spaced by a spacer to form the coin passage therebetween.

13. A coin lifting mechanism for lifting coins comprising:

a coin guiding track defining a coin passage for slidably moving coins in edge-to-edge contact with each other in a generally upward direction from an intake end of the track in communication with the passage to a discharge end of the track in communication with the passage, with the coins in edge-to-edge contact between the intake end and the discharge end;

first and second rollers disposed substantially parallel to each other and having peripheries engageable with a face of a coin proximate the intake end of the track;

means resiliently urging the peripheries of the rollers towards each other and into contact with a coin disposed between the peripheries; and an activator for rotating the first and second rollers in opposite directions while the roller peripheries are urged against the faces of the coin to thereby advance the coin along a portion of the passage;

whereby additional coins in the passage and in edge-to-edge contact with each other are caused to move along the passage by the coin disposed between the roller peripheries.

14. The coin lifting mechanism of claim 13 including a cutout formed in the guiding track and overlying the coin passage, the roller peripheries extending through the cutout into the coin passage.

15. The coin lifting mechanism of claim 14 wherein the cutout is located upstream of the intake end of the track.

16. The coin lifting mechanism of claim 15 wherein the cutout is spaced apart from the intake end of the track.

17. The coin lifting mechanism of claim 16 wherein the track is formed by first and second, spaced-apart, substantially rigid sheets which define the coin passage, and wherein the cutout comprises first and second cutouts formed in the first and second sheets, respectively.

18. The coin lifting mechanism of claim 13 wherein the pair of rollers are substantially round and identical in size.

19. The coin lifting mechanism of claim 13 further comprising means for adjusting the minimum gap.

20. A coin lifting mechanism for lifting coins to an elevated position, the coin lifting mechanism comprising:

a coin lifting rail extending from a coin receiving end upward to a coin discharging end and including a coin passage having a size to receive coins edge-to-edge in series; and drive means for contacting and releasing faces of the coins one-by-one and for driving the coins in sliding motion through the coin passage in edge-to-edge contact, the rail and the drive means being operative for advancing the coins along the rail in increments of a size which is substantially equal to a diameter of the coins, with the coins in edge-to-edge contact between the drive means and the discharge end.

21. The coin lifting mechanism of claim 20 further comprising a reverse movement preventing mechanism coupled to the coin lifting rail to prevent the coins from sliding back toward the coin receiving end.

22. The coin lifting mechanism of claim 20 wherein the contacting and releasing means drives the coins in successive contact through the coin passage.

23. The coin lifting mechanism of claim 20 wherein the coin passage has a width slightly larger than a diameter of the coins and a depth slightly larger than a thickness of the coins.

24. The coin lifting mechanism of claim 20 wherein the coin lifting rail includes a pair of sheets spaced by a spacer to form the coin passage therebetween.

25. A method of lifting coins from a relatively lower point to a relatively higher point, the method comprising the steps of providing a track capable of holding coins in edge-to-edge contact between an intake end of the track proximate the lower point and a discharge end of the track proximate the upper point; placing a number of coins in the track so that the coins in edge-to-edge contact extend from about the intake end to about the discharge end; frictionally engaging faces of the coin with first and second movable surfaces; and setting the movable surfaces while they are in frictional contact with the faces in motion to thereby advance a coin proximate the intake end, and therewith the number of coins in the track, towards the discharge end so that a coin closest to the discharge end is discharged from the track.

* * * * *